March 12, 1929.  C. V. FUQUA  1,705,009
MASTER TRAP
Filed July 5, 1927
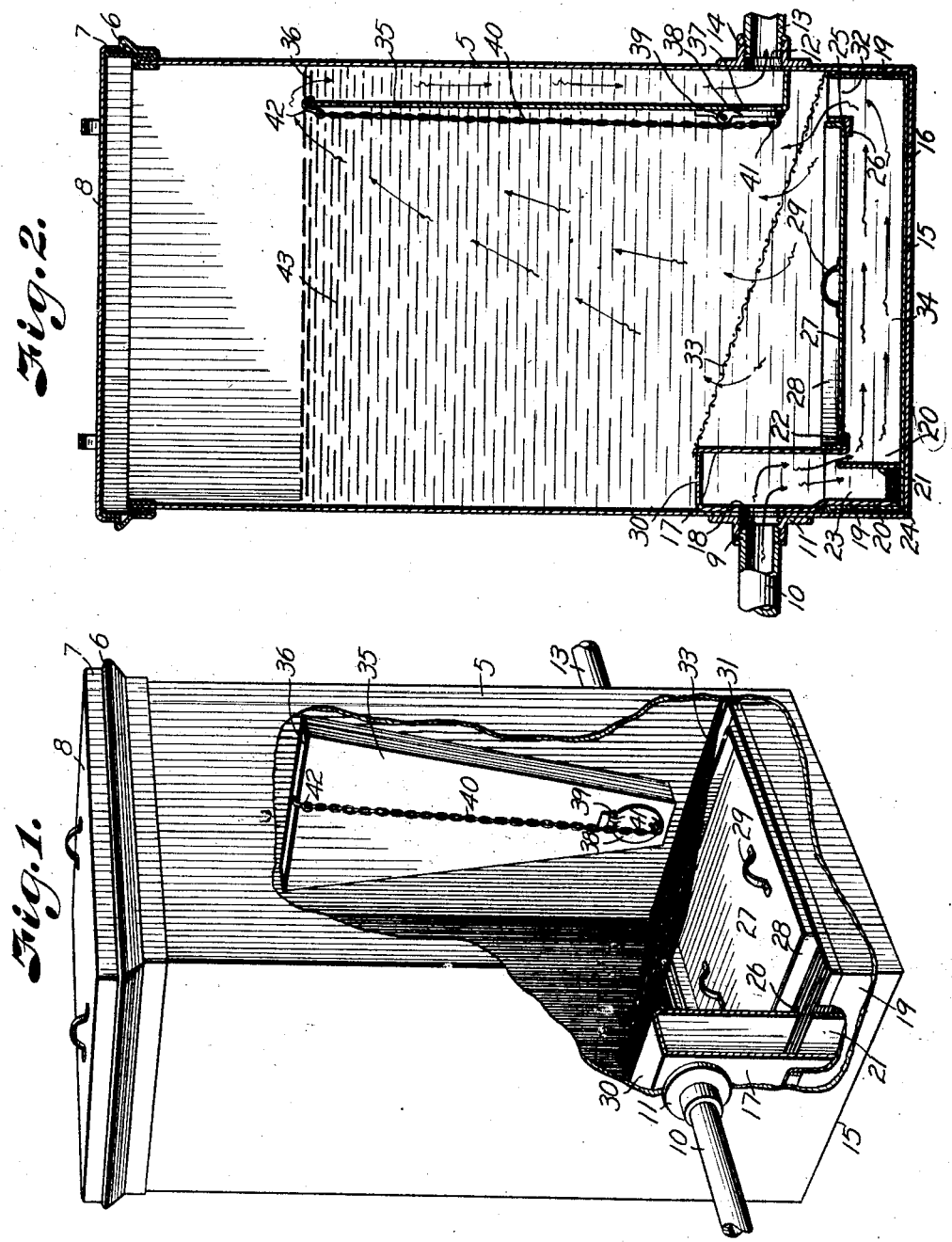
INVENTOR
Clarence V. Fuqua
BY
ATTORNEY Patented Mar. 12, 1929.

1,705,009

UNITED STATES PATENT OFFICE.

CLARENCE V. FUQUA, OF KANSAS CITY, MISSOURI, ASSIGNOR TO THE CLEANERS EQUIPMENT CORPORATION, OF KANSAS CITY, MISSOURI, A CORPORATION OF MISSOURI.

MASTER TRAP.

Application filed July 5, 1927. Serial No. 203,554.

My invention relates to traps and more particularly to a master trap for use in cleaning fluid clarifying systems.

It is a purpose of my invention to provide a trap of the above mentioned character in which the solid particles in the cleaning fluid can be readily collected and the collected solid particles can be easily removed. In order to accomplish this purpose a collection receptacle is preferably provided within the trap that is removable for cleaning purposes.

It is a further purpose of my invention to provide a trap of the above mentioned character with an inlet and an outlet and baffle means between the inlet and outlet, said baffle means preferably comprising means for collecting foreign matter in the cleaning fluid. More particularly the baffle means preferably comprises a collecting receptacle having an elongated body portion provided with an inlet at one end adapted to align with the inlet into the trap and an outlet adjacent the other end with means for collecting solid particles between said inlet and outlet. A collection chamber for said solid particles is preferably provided by the employment of a baffle plate between the inlet and the outlet of said collecting receptacle.

It is a further purpose of my invention to provide a removable cover for the collecting receptacle which is preferably in the form of a pan-like member and to provide an inclined screen above the outlet of said collection receptacle which is located above said pan like cover member being adapted to receive material that does not pass through the screen thereon. Thus the entire collecting means including the elongated body portion, the cover member and the screen can be readily removed for cleaning purposes.

Means is preferably provided for maintaining a substantially constant liquid level in the trap, said means comprising a conduit extending upwardly from the outlet and normally closed except at the entrance thereof at the upper end of the conduit, said conduit preferably flaring toward the upper end thereof. In order to provide means for draining the trap when the same is to be cleaned, an inlet having a closure member normally in closed position is provided into said conduit adjacent the outlet connection.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view, partly broken away, of my improved trap, and

Fig. 2 is a vertical sectional view thereof.

Referring in detail to the drawings:

My improved trap comprises a body portion 5 which is provided with a peripheral laterally extending flange 6 adjacent the top thereof with which the depending flange 7 on the removable cover member 8 is adapted to be engaged. One side of the body portion 5 is provided with an inlet opening 9 therein into which the inlet pipe 10 leads, said inlet pipe being secured to the body portion by means of the flanged member 11 having screw threaded engagement with the pipe 10 and secured to the side wall of the member 5 in any desired manner. Located on the opposite side of the body portion 5 from the inlet opening 9 is an outlet opening 12 from which the outlet pipe 13 leads, said outlet pipe being secured to the side wall of the member 5 by means of the flange member 14 having screw threaded engagement with said pipe.

Resting on the bottom 15 of the body portion 5 is an elongated receptacle 16 which has an upwardly offset end portion 17, the wall of which adjacent the side wall of the member 5 is provided with an opening 18 aligning with the opening 9. The end portion 17 of the receptacle is preferably made separable from the tray like body portion thereof, said tray like body portion having the upstanding walls 19, and the offset portion 17 having the depending wall portions 20 lying adjacent the upstanding wall portions 19 with the lower edges thereof engaging with the bottom of the tray like member 16. The member 17 is preferably made removable for cleaning purposes.

Mounted within the collecting receptacle formed by the tray-like member 16 and the upwardly offset portion 17 and in alignment with the upwardly offset portion is a baffle plate 21, said baffle plate being preferably carried by said upstanding portion and terminating closely adjacent the flange 22 on said portion 17 to thus slow down the flow of the liquid through the device and prevent the passage of particles such as buttons and the like from passing through the collecting receptacle. The buttons or like particles will collect at the bottom of the compartment 23 thus formed in the chamber 16, the same being indicated by the numeral 24.

The member 16 is further provided with an angular transversely extending member 25 having a flange 26 thereon and a pan-like cover member 27 is mounted upon the flanges 22 and and 26, said cover member having a peripheral flange portion 28 and being provided with handles 29 so as to facilitate removal thereof.

Resting upon the top wall 30 of the upwardly offset portion 17 of the collecting receptacle and upon the edge portion 31 of said receptacle adjacent the outlet 32 is a screen 33, said screen being thus inclined at an angle and being slightly spaced from the outlet 32 and overlying the pan-like cover member 27.

As the cleaning liquid passes into the member 17 through the openings 9 and 18, all particles such as buttons, matches and other heavy material that has been carried along with the cleaning liquid will be deposited in the compartment 23 and the cleaning liquid will flow over the upper edge of the partition or baffle plate 21 into the elongated compartment 34 formed between the cover 27 and the bottom of the receptacle 16. During such flow the dirt being carried along with the cleaning liquid is deposited on the bottom of the tray-like receptacle 16 and the liquid then flows upwardly through the outlet 32 and through the screen 33. The screen 33 collects other foreign matter in the cleaning liquid, the matter collected by the screen 33 dropping off the same and into the pan-like cover member 27. The cleaning liquid then travels upwardly toward the entrance to the outlet connection provided for the trap.

The outlet connection provided on the trap preferably comprises a tapering conduit 35 which flares upwardly toward the entrance 36 thereof, said entrance being relatively wide and lying adjacent one of the side walls of the body portion 5 and overlying the opening 12 at its lower end thereof. The conduit is provided adjacent its lower end with an opening 37 which is normally closed by means of the closure member 38 hinged to the conduit at 39 and movable into open position by means of a flexible member 40 such as a chain attached to the eye 41 on said closure member. A hook 42 may be provided on the opposite end of the flexible member 40 by means of which the same may be supported by the upper edge portion of the conduit 35 as clearly shown in the drawings to make the flexible member readily accessible to the operator when it is desired to clean the receptacle, the purpose of the closure member 38 being to provide a drain for the tank when it is desired to lower the level of the liquid 43 therein at times when the trap is to be cleaned out.

To clean the trap the cover member 8 is removed after which the flexible member 40 is manipulated to open the outlet 37 and thus lower the level of the liquid 43. Then the screen 33 is removed and after this has been done the pan-like cover member 27 is removed after which the member 17 and the member 16 are removed so that access can be had to all the various parts of the collecting receptacle to clean the collected material out of the same. After the parts have been cleaned and the collected material 24 has been removed from the compartment 24, the member 17 is replaced in position in the member 16, the cover member 27 is replaced as is also the screen 33, the closure member 38 is moved into position to close the opening 37, the cover 8 is replaced and the device is ready for further operation as a trap, the liquid maintaining a level therein substantially even with the top edge of the conduit 35 at the entrance 36.

What I claim and desire to secure by Letters Patent is:

1. In a trap of the character described, a body portion having an inlet and an outlet and removable baffle means between said inlet and outlet, said means comprising a removable tray-like baffle member mounted in front of said inlet, and a baffle plate in said member spaced from the inlet to define a collecting chamber for solid particles.

2. In a trap of the character described, a body portion having an inlet and an outlet and removable baffle means between said inlet and outlet, said means comprising a removable tray-like baffle member mounted in front of said inlet, said tray-like member having a removable cover member.

3. In a trap of the character described, a body portion having an inlet and an outlet and baffle means between said inlet and outlet comprising a baffle member having an elongated tray-like body portion and an offset end portion having an opening aligning with said inlet.

4. In a trap of the character described, a body portion having an inlet and an outlet and baffle means between said inlet and outlet comprising a baffle member having an elongated tray-like body portion and an offset end portion having an opening aligning with said inlet, said member having a baffle plate between said portions to define a collecting chamber for solid particles.

5. In a trap of the character described, a body portion having an inlet and an outlet and a collecting receptacle in said body portion between said inlet and outlet, said receptacle having an elongated body portion provided with an inlet adjacent one end thereof aligning with the inlet in said body portion and an outlet adjacent the other end thereof, and a baffle plate in said receptacle between said inlet and outlet.

6. In a trap of the character described, a body portion having an inlet and an outlet and a collecting receptacle in said body portion between said inlet and outlet, said receptacle having an elongated body portion provided with an inlet adjacent one end thereof aligning with the inlet in said body portion and an outlet adjacent the other end thereof, and a removable cover for said receptacle.

7. In a trap of the character described, a body portion having an inlet and an outlet and a collecting receptacle in said body portion between said inlet and outlet, said receptacle having an elongated body portion provided with an inlet adjacent one end thereof aligning with the inlet in said body portion and an outlet adjacent the other end thereof, an inclined screen above said outlet overlying said receptacle, and a removable cover for said receptacle under said screen.

8. In a trap of the character described, a body portion having an inlet and an outlet and a collecting receptacle in said body portion between said inlet and outlet, said receptacle having an elongated body portion provided with an inlet adjacent one end thereof aligning with the inlet in said body portion and an outlet adjacent the other end thereof, an inclined screen above said outlet overlying said receptacle, and a removable pan-like cover for said receptacle under said screen.

9. In a trap of the character described, a body portion having an inlet and an outlet and baffle means therein between said inlet and outlet comprising a conduit extending upwardly from said outlet and having its entrance located a substantial distance above said outlet to maintain a predetermined level of liquid in said trap, and means for admitting said liquid to said conduit adjacent said outlet to drain said trap.

10. In a trap of the character described, a body portion having an inlet and an outlet and baffle means therein between said inlet and outlet comprising a conduit extending upwardly from said outlet and having its entrance located a substantial distance above said outlet to maintain a predetermined level of liquid in said trap, said conduit having an inlet near the bottom thereof and means for normally closing said inlet.

11. In a trap of the character described, a body portion having an inlet and an outlet and baffle means therein between said inlet and outlet comprising an upwardly flaring conduit extending upwardly from said outlet and having its entrance located a substantial distance above said outlet to maintain a predetermined level of liquid in said trap, and means for admitting said liquid to said conduit adjacent said outlet to drain said trap.

12. In a trap of the character described, a body portion having an inlet and an outlet and baffle means therein between said inlet and outlet comprising an upwardly flaring conduit extending upwardly from said outlet and having its entrance located a substantial distance above said outlet to maintain a predetermined level of liquid in said trap.

In testimony whereof I affix my signature.

CLARENCE V. FUQUA.